United States Patent
Mizusaki

(10) Patent No.: US 7,382,416 B2
(45) Date of Patent: Jun. 3, 2008

(54) NONLINEAR PROCESS CIRCUIT USED FOR IMAGE PROCESSING

(75) Inventor: Yasuyuki Mizusaki, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 803 days.

(21) Appl. No.: 10/812,989

(22) Filed: Mar. 31, 2004

(65) Prior Publication Data

US 2004/0252240 A1 Dec. 16, 2004

(30) Foreign Application Priority Data

Apr. 2, 2003 (JP) .............................. 2003-098864

(51) Int. Cl.
*H04N 5/202* (2006.01)
*H03G 3/20* (2006.01)

(52) U.S. Cl. ...................................... 348/674; 348/254

(58) Field of Classification Search ................ 348/674, 348/254, 241–242, 255–256, 671–672, 675, 348/676–677; 382/260, 264; 345/589, 610, 345/600–601; *H04N 5/202; H03G 3/20*

See application file for complete search history.

(56) References Cited

U.S. PATENT DOCUMENTS

| | | | | | |
|---|---|---|---|---|---|
| 5,408,267 | A | * | 4/1995 | Main | 348/254 |
| 6,166,871 | A | * | 12/2000 | Takaishi | 360/53 |
| 6,573,934 | B1 | * | 6/2003 | Lee | 348/254 |
| 6,833,876 | B1 | * | 12/2004 | Pirjaberi | 348/674 |
| 6,900,747 | B2 | * | 5/2005 | Lee | 341/106 |

FOREIGN PATENT DOCUMENTS

| | | |
|---|---|---|
| JP | 6-245221 | 9/1994 |
| JP | 11-196293 | 7/1999 |
| JP | 2000-184236 | 6/2000 |

* cited by examiner

*Primary Examiner*—Trang U. Tran
(74) *Attorney, Agent, or Firm*—Oblon, Spivak, McClelland, Maier & Neustadt, P.C.

(57) ABSTRACT

A circuit, method and computer program product wherein a nonlinear signal outputted from a nonlinear circuit is non-linearly processed in two steps using a main circuit and an assistant circuit. The main circuit performs a first relatively rough nonlinear process (main correction), and the assistant circuit performs fine a second adjustment (sub-correction) process on the nonlinearly-processed signal resulting from the first process.

8 Claims, 8 Drawing Sheets input signal

NONLINEAR PROCESS CIRCUIT USED FOR IMAGE PROCESSING

CROSS REFERENCE TO RELATED APPLICATION

This application is based upon and claims the benefit of priority from the prior Japanese Patent Application No. 2003-098864 filed on Apr. 2, 2003, the entire contents of which are incorporated herein by reference.

FIELD OF THE INVENTION

The present invention relates to a nonlinear process circuit which is used for image processing and which performs a nonlinear process on an input signal.

BACKGROUND OF THE INVENTION

A γ characteristic is a characteristic relating an input signal value to a display luminance in a display such as a cathode ray tube (CRT), a liquid crystal display (LCD), or the like.

In general, the luminance L of a CRT varies in proportion to an input signal value E of the CRT raised to the power of γ (L=KE$^\gamma$: K is a constant). Therefore, in order to perform correct half-toning, a signal on which inverse correction for raising a number to the power of 1/γ has been previously performed needs to be applied to the CRT. This is γ correction.

In general, for example, as described in Japanese Patent Laid Open (Kokai) No. PH06-245221, in a method of γ correction, a translation table for all input points is stored in a read only memory (ROM). Using this translation table, translation has been performed.

However, since an enormous amount of data of the translation table is stored in a memory such as a ROM, a necessary memory capacity has been increased, and a circuit has been enlarged.

To cite another method of γ correction, for example, a nonlinear process can be performed using an approximated γ characteristic (hereinafter referred to as approximate linear γ characteristic) having eight break points as shown in FIG. 1. This method provides the advantage that a memory, such as a ROM, for storing a translation table requiring an enormous capacity becomes unnecessary.

The approximate linear γ characteristic as shown in FIG. 1 is divided into eight break point intervals, first to eighth intervals, and is a linear broken line having respective predetermined gradients (a1 to a8) in the intervals. For example, when an input signal is denoted by x, multiplication processes are performed as follows: a multiplication process for the first interval is a1×x$_1$, a multiplication process for the second interval is a2×x$_2$, and the like.

When a nonlinear signal is inputted, signals resulting from the multiplication processes for the respective intervals are summed, whereby a nonlinearly-processed signal resulting from approximate γ correction is formed.

FIG. 2 is a configuration diagram of a nonlinear process circuit 100 using the approximate linear γ characteristic shown in FIG. 1.

The nonlinear process circuit 100 includes a interval decision circuit 102 for determining an inputted nonlinear signal, eight process circuits 103 to 110 for performing respective processes for the intervals, an output signal selection circuit 111 for adding respective signals processed by these eight process circuits 103 to 110, and an approximate linear register circuit 112 for storing the respective gradients and the like for the intervals.

The interval decision circuit 102 is a circuit for detecting to which interval a nonlinear input signal outputted from the nonlinear circuit 101 belongs.

Each of the process circuits 103 to 110 is a circuit for multiplying a nonlinear signal by the gradient of the approximate linear line set in the approximate linear register circuit 112.

The output signal interval circuit 111 is a circuit for performing an addition process on all signals resulting from the multiplication processes performed by the respective process circuits 103 to 110.

The approximate linear register circuit 112 is a circuit for storing set values for signal processing in the respective process circuits 103 to 110.

For example, in the case where a nonlinear signal X3' is inputted for the approximate linear γ characteristic shown in FIG. 1, the interval decision circuit 102 detects that the inputted nonlinear signal X3' falls in the third interval.

The first process circuit 103 multiplies the gradient a1=(Y1−Y0)/(X1−X0) and input signal data (X1−X0) of the first process circuit 103. Accordingly, the first process circuit 103 outputs a signal (Y1−Y0).

The second process circuit 104 multiplies the gradient a2=(Y2−Y1)/(X2−X1) and input signal data (X2−X1) of the second process circuit 104. Accordingly, the second process circuit 104 outputs a signal (Y2−Y1).

The third process circuit 105 multiplies the gradient a3=(Y3−Y2)/(X3−X2) and input signal data (X3'−X2) of the third process circuit 105. Accordingly, the third process circuit 105 outputs a signal (X3'−X2)/(X3−X2)×(Y3−Y2).

In the fourth to eighth process circuits 106 to 110 other than the above, input signal data is zero. Accordingly, the output signals of the fourth to eighth process circuits 106 to 110 are zero.

Signals processed by these first to eighth process circuits 103 to 110 are added by the output signal interval circuit 111, thus outputting a nonlinearly-processed output signal. The nonlinearly-processed output signal in this case is (Y3'−Y0).

Thus, the nonlinear process circuit 100 does not require a memory such as a ROM. However, process circuits as many as the number of intervals are required. Moreover, the setting of the multiplication process of each process circuit must be individually performed, and the amount of information of set values within the approximate linear register circuit 112 is increased. Therefore, the nonlinear process circuit has been enlarged.

SUMMARY OF THE INVENTION

According to one aspect of the present invention, there is provided a nonlinear process circuit configured to perform a nonlinear transformation of a nonlinear input signal, comprising a main circuit configured to form the nonlinear input signal into a first nonlinearly-processed signal using a first function which has an approximate linear characteristic divided into a plurality of intervals; and an assistant circuit configured to form the first nonlinearly-processed signal into a second nonlinearly-processed signal using a second function which has an approximate linear characteristic divided in which each of the intervals into two is divided into two connected line segments.

According to another aspect of the present invention, there is provided a method for performing a nonlinear transformation of a nonlinear input signal, including (a) forming the nonlinear input signal into a first nonlinearly-processed signal using a first function which has an approximate linear characteristic divided into a plurality of intervals; and (b) converting the first nonlinearly-processed signal into a second nonlinearly-processed signal using a second function wherein plural of the intervals have an approximate linear characteristic divided into two interconnected line segments.

According to a further aspect of the present invention, there is provided a computer program product storing instructions which when executed by a computer causes the computer to implement a method for performing a nonlinear transformation of a nonlinear input signal, the method comprising (a) forming the nonlinear input signal into a first nonlinearly-processed signal using a first function which has an approximate linear characteristic divided into a plurality of intervals; and (b) converting the first nonlinearly-processed signal into a second nonlinearly-processed signal using a second function wherein plural of the intervals have an approximate linear characteristic divided into two interconnected line segments.

DETAILED DESCRIPTION OF THE INVENTION

Figure 1:
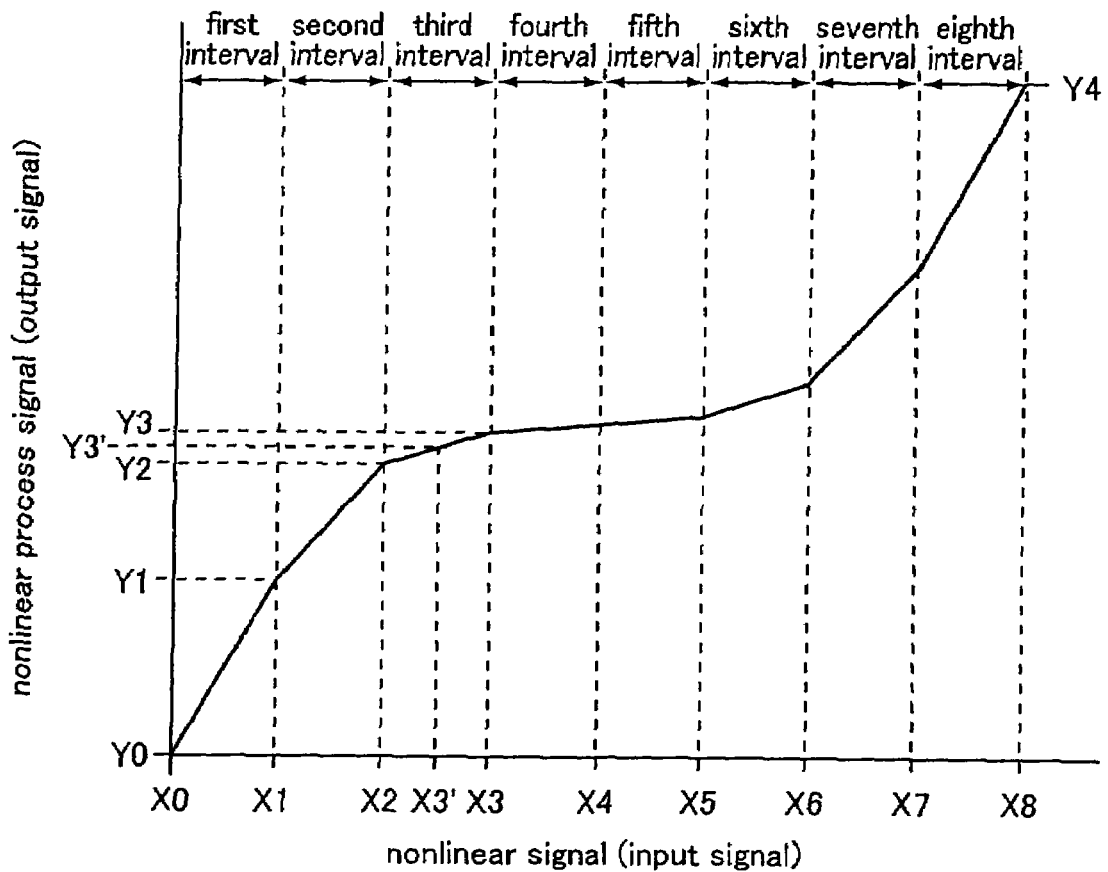
FIG. 1 shows an approximate linear γ function for a nonlinear process circuit of a prior art.
Figure 2:
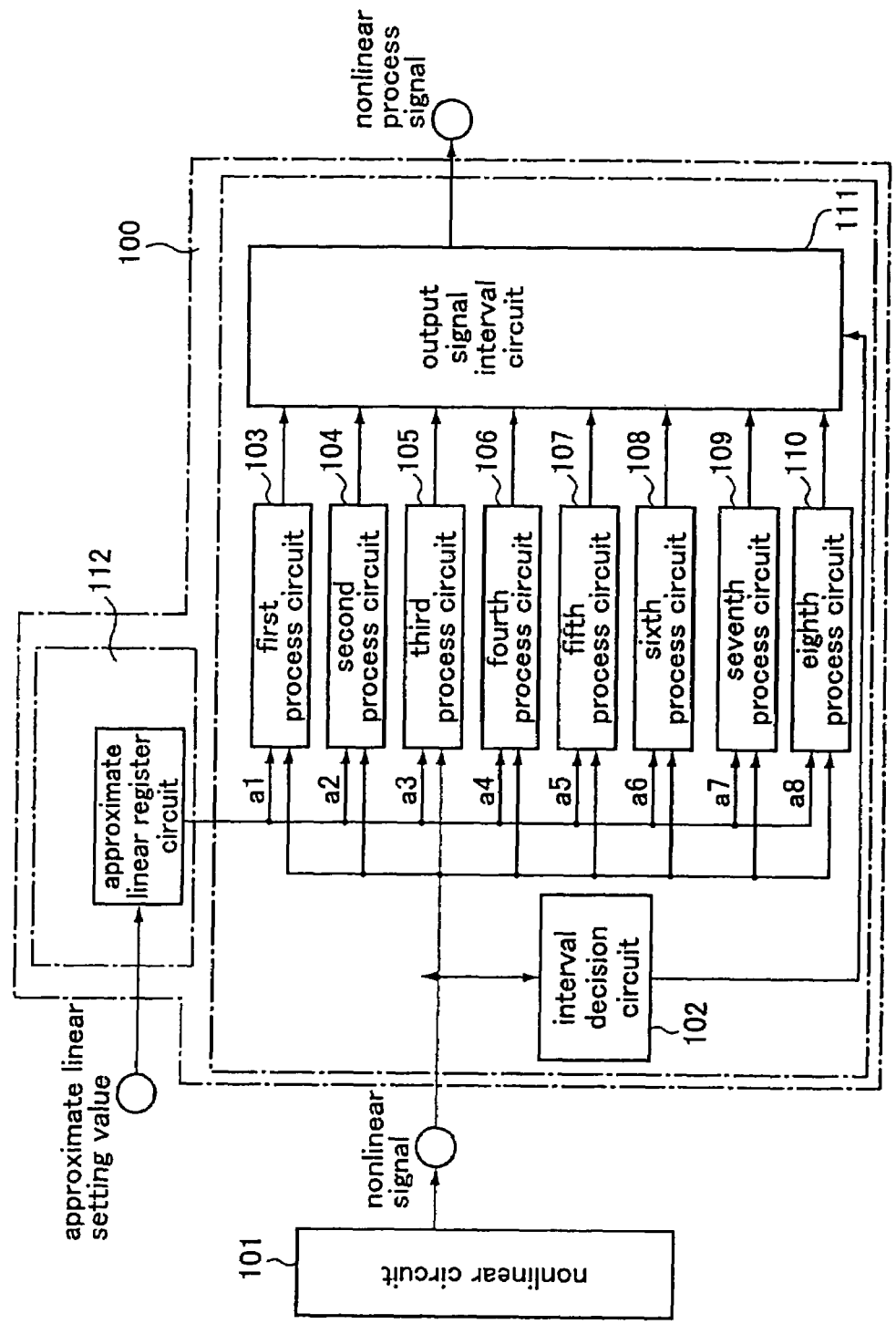
FIG. 2 is a circuit diagram of the nonlinear process circuit of the prior art.

A nonlinear process circuit of embodiments of the present invention is next described with reference to drawings wherein like reference numerals designate the same or corresponding parts throughout the several views.

Figure 3:
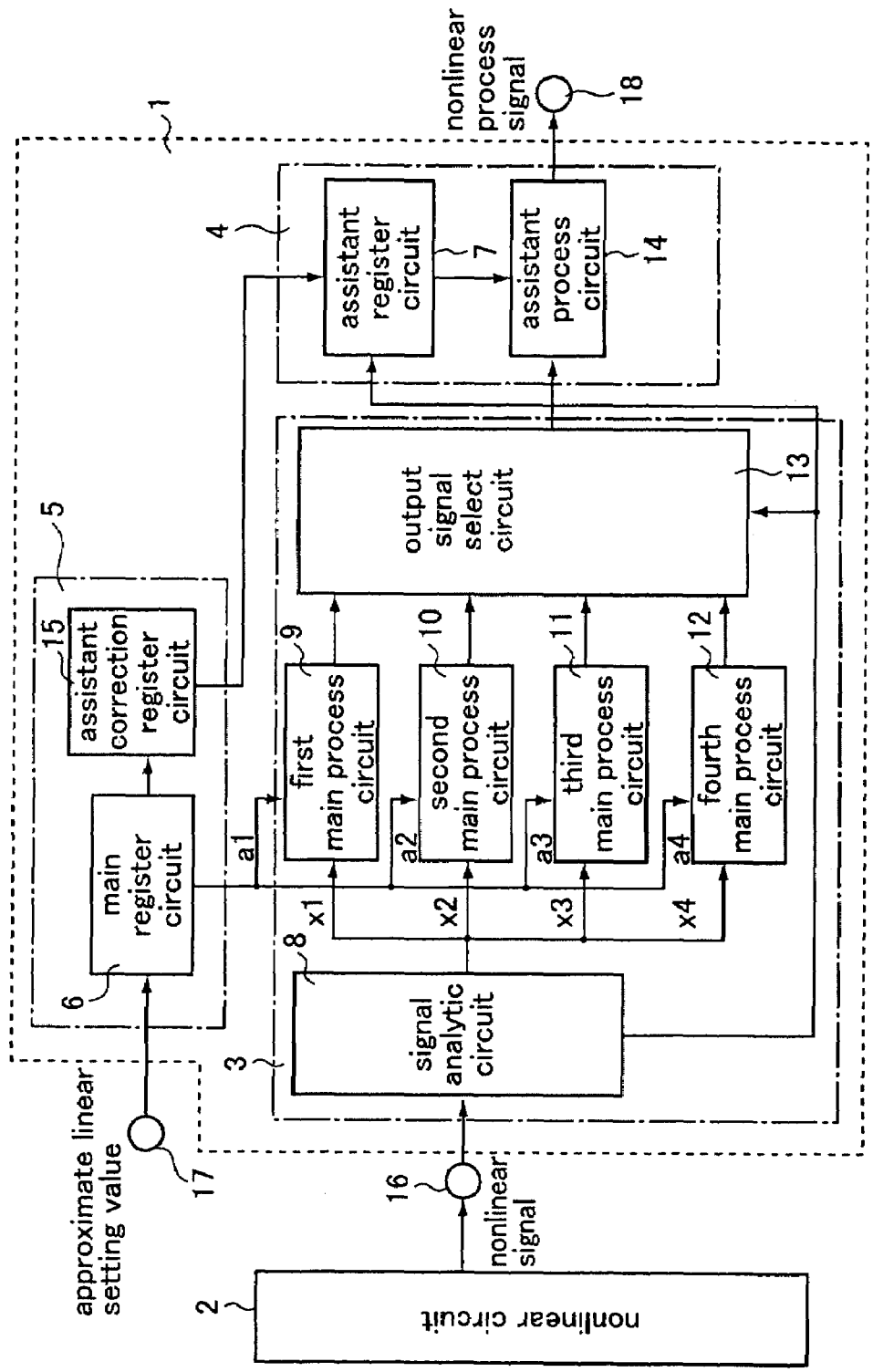
FIG. 3 is a circuit diagram of a nonlinear process circuit according to a first embodiment of the present invention.
Figure 4:
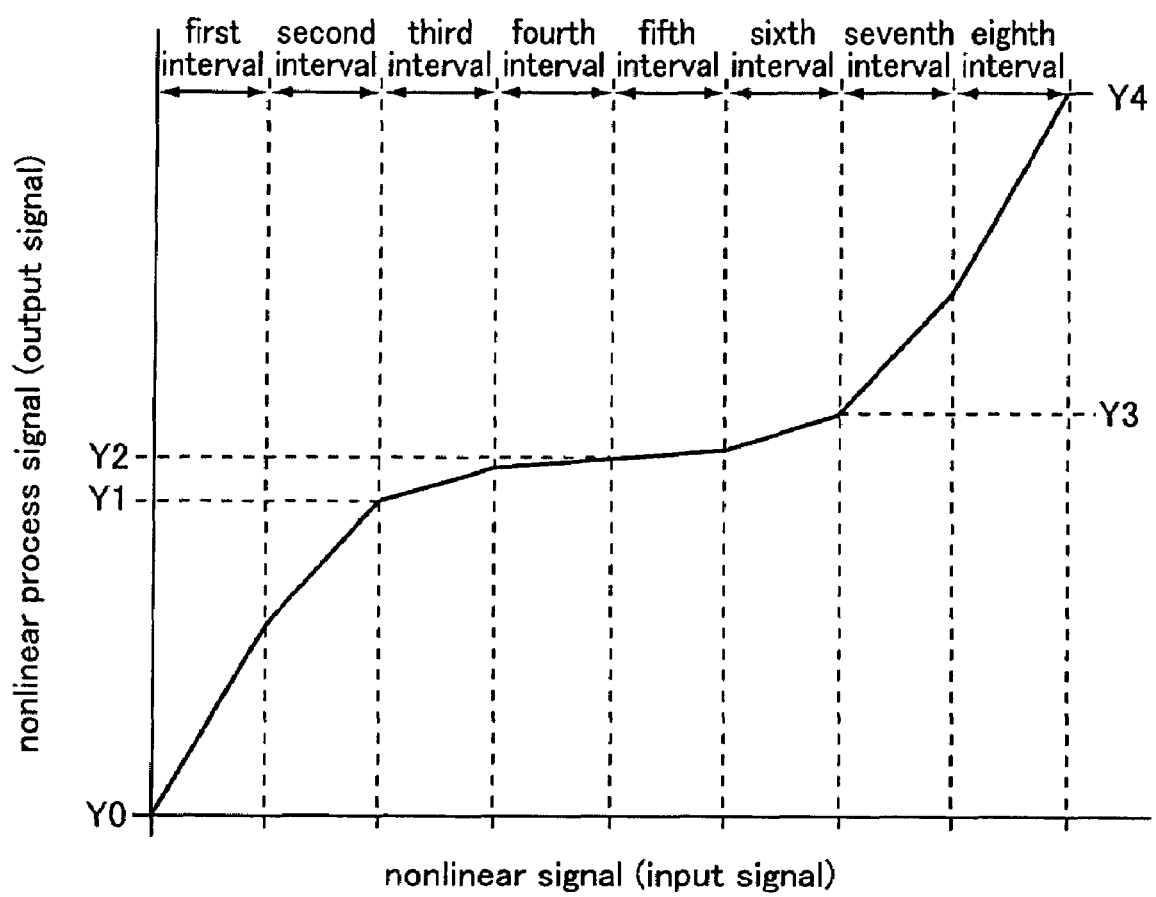
FIG. 4 shows an approximate linear γ function for the nonlinear process circuit shown in FIG. 3.

FIG. 3 is a circuit diagram showing a nonlinear process circuit 1 according to a first embodiment. FIG. 4 shows an approximate linear γ function including eight intervals processed in the nonlinear process circuit 1 shown in FIG. 3. A nonlinear signal (input signal) inputted into a signal input terminal 16 is put on the horizontal axis, and a nonlinearly-processed signal (output signal) outputted from a signal output terminal 18 is put on the vertical axis.

The nonlinear process circuit 1 includes a main circuit 3, an assistant circuit 4, and an approximate linear register circuit 5.

A nonlinear signal outputted from the nonlinear circuit 2 is nonlinearly processed in two steps using the main circuit 3 and the assistant circuit 4. Respective set values of the respective nonlinear processes of the main circuit 3 and the assistant circuit 4 are stored in a main register circuit 6 within the approximate linear register circuit 5 and an assistant register circuit 7 within the assistant circuit 4. The main register circuit 6 and the assistant register circuit 7 include storage circuits such as registers.

The main circuit 3 includes a signal analytic circuit 8 for analyzing an inputted nonlinear signal, four main process circuits 9 to 12 for performing multiplication processes on input signals in a number, e.g., four in the illustrative example shown, divided folded intervals, and an output signal select circuit 13 for performing an addition process on signals processed by these main process circuits 9 to 12.

The assistant circuit 4 includes an assistant process circuit 14 for finely adjusting a signal processed by the main circuit 3, and the assistant register circuit 7 for storing a correction value in this assistant process circuit 14.

The approximate linear register circuit 5 includes the main register circuit 6 for setting the main circuit 3, and an assistant correction register circuit 15 for storing correction values for setting the assistant circuit 4.

A nonlinear signal outputted from the nonlinear circuit 2 is inputted into the nonlinear process circuit 1 through a signal input terminal 16.

The nonlinear signal inputted into the nonlinear process circuit 1 is inputted into the signal analytic circuit 8. The signal analytic circuit 8 determines which main process circuit out of the four main process circuits, i.e., the first to fourth main process circuits 9 to 12, processes the nonlinear signal. Moreover, from the nonlinear signal, the signal analytic circuit 8 forms to-be-processed signals to be outputted to the respective main process circuits 9 to 12.

Figure 5:
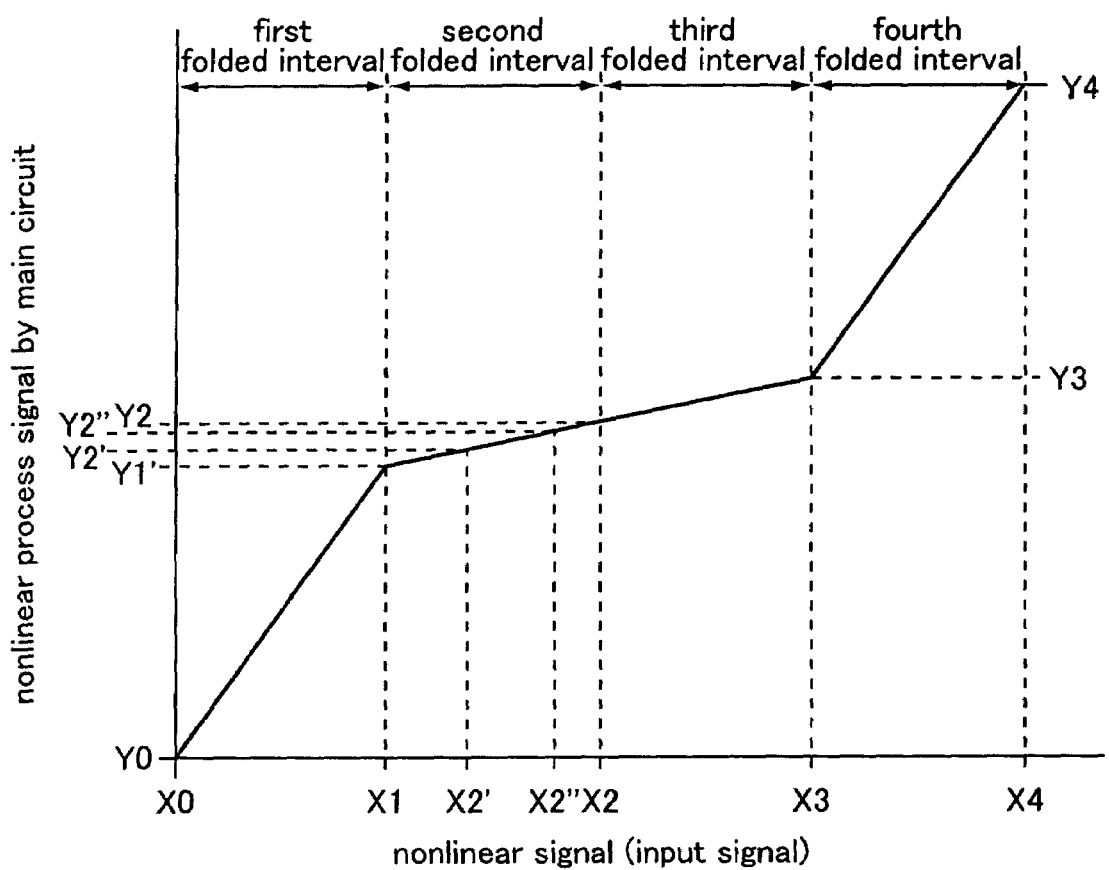
FIG. 5 shows an approximate lineary γ function for the nonlinear process circuit in a main circuit.

FIG. 5 shows an approximate linear γ function (first approximate linear γ function) which is used in the main circuit 3 and which is divided into four folded intervals. That is, this is an approximate linear γ function having first to fourth folded intervals. The number of folded intervals is a half of that of the approximate linear γ characteristic having the eight intervals shown in FIG. 4.

The main process circuits 9 to 12 multiply the gradients of approximation lines in the respective folded intervals and the to-be-processed signals formed by the signal analytic circuit 8.

The gradients in the first to fourth folded intervals are denoted by a1, a2, a3, and a4, respectively. In the respective nonlinear processes in the folded intervals, when respective signals inputted into the folded intervals are denoted by $x_1$, $x_2$, $x_3$, and $x_4$, multiplication processes are performed in such a manner that $a1 \times x_1$ in the first folded interval, $a2 \times x_2$ in the second folded interval, $a3 \times x_3$ in the third folded interval, and $a4 \times x_4$ in the fourth folded interval, thus forming respective output signals of the folded intervals.

The respective coefficients of these gradients (a1 to a4) are stored in the main register circuit 6 within the approximate linear register circuit 5. The values of these gradients can be inputted from a linear approximation setting terminal 17 to be written on the main register circuit 6.

For example, in the case where a nonlinear signal X2' is inputted from the nonlinear circuit 2 into the main circuit 3 having the approximate linear γ characteristic shown in FIG. 5, the signal analytic circuit 8 determines that the input signal falls in the second folded interval.

Furthermore, the signal analytic circuit 8 forms to-be-processed signals $x_1=(X1-X0)$ and $x_2=(X2'-X1)$ from the nonlinear signal. Out of these formed signals, one to-be-processed signal (X1−X0) is inputted into the first main process circuit 9, and the other to-be-processed signal (X2'−X1) is inputted into the second main process circuit 10.

The first main process circuit 9 reads the gradient a1= (Y1−Y0)/(X1−X0) for the first main process circuit 9, which is stored in the main register circuit 6. A multiplication process of this gradient a1 and the to-be-processed signal (X1–X0) formed by the signal analytic circuit 8 is performed. That is, the first main process circuit 9 outputs a signal (Y1–Y0).

The second main process circuit 10 reads the gradient a2=(Y2–Y1)/(X2–X1) for the second main process circuit 10, which is stored in the main register circuit 6. A multiplication process of this gradient a2 and the to-be-processed signal (X2'–X1) formed by the signal analytic circuit 8 is performed. That is, the second main process circuit 10 outputs a signal (Y2'–Y1).

The third and fourth main process circuits 11 and 12 other than the above do not process signals. This is because signals inputted into the third and fourth main process circuits 11 and 12 from the signal analytic circuit 8 are zero, i.e., $x_3=x_4=0$.

The output select circuit 13 adds the processed signals (Y2'–Y0) resulting from the multiplication processes performed by the first and second main process circuits 9 and 10 to form a first nonlinearly-processed signal.

Next, the assistant circuit 4 performs fine adjustment (sub-correction) on the first nonlinearly-processed signal resulting from the nonlinear process (main correction) based on the rough first approximate linear γ characteristic shown in FIG. 5 in the main circuit 3.

This sub-correction is performed by use of the assistant circuit 4 including the assistant process circuit 14 and the assistant register circuit 7, and the assistant correction register circuit 15 within the approximate linear register circuit 5.

The assistant correction register circuit 15 stores respective maximum gain correction amounts for the folded intervals which the first approximate linear γ characteristic used in the main circuit 3. Since the first approximate linear γ characteristic for the main circuit 3 of the first embodiment has four folded intervals, the number of set values which need to be stored in the assistant correction register circuit 15 is four.

The assistant register circuit 7 reads the maximum gain correction amount of one folded interval, which is stored in the assistant correction register circuit 15, and stores the maximum gain correction amount. As described previously, the signal analytic circuit 8 can analyze the inputted nonlinear signal to determine the folded interval to which this nonlinear signal belongs. The assistant register circuit 7 can read only the corresponding maximum gain correction amount from the assistant correction register circuit 15.

The assistant process circuit 14 is a circuit for finely adjusting the first nonlinearly-processed signal resulting from the main correction performed by the main circuit 3.

An exemplary processing method of the sub-correction in the assistant circuit 4 is described. The description below takes the case where a nonlinear signal X2' in the second folded interval of the first approximate linear γ characteristic shown in FIG. 5 is inputted into the main circuit 3, as an example.

Figure 6A:
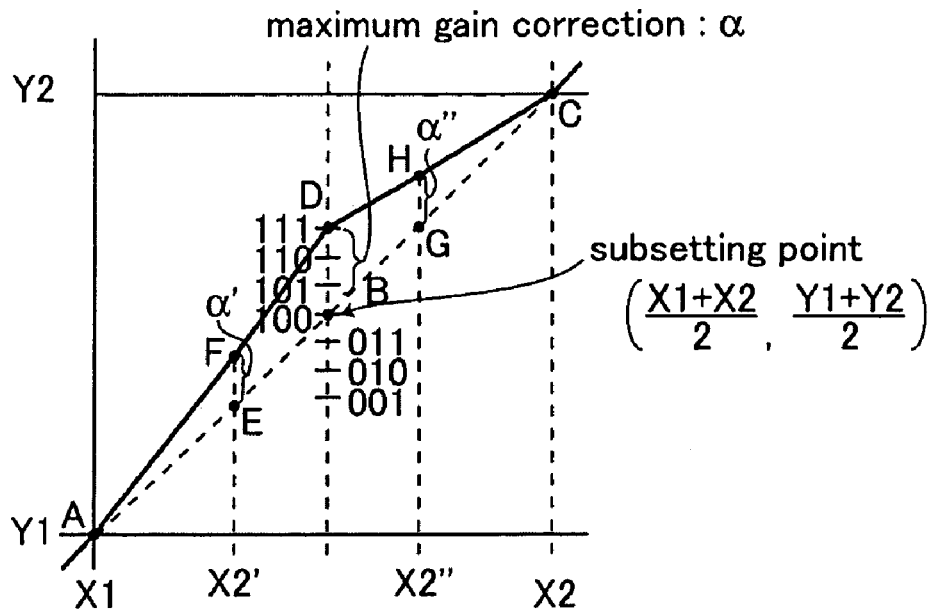
FIG. 6 shows part of an approximate linear γ function for the nonlinear process circuit in an assistant circuit.

FIG. 6A shows an approximate linear γ function obtained by enlarging the second folded interval of the approximate linear γ characteristic shown in FIG. 5, i.e., the third and fourth interval of the approximate linier γ characteristic shown in FIG. 4. The straight line segment represented by a dotted line ABC is the first approximate linear γ characteristic used in the aforementioned main circuit 3. The linear broken line segment ADC represented by a solid line is a second approximate linear γ characteristic resulting from the sub-correction performed by the assistant circuit 4.

An exemplary method of forming the second approximate linear γ characteristic is described. The midpoint B ((X1+X2)/2, (Y1+Y2)/2) of the first approximate linear γ characteristic in the second folded interval is set as a subsetting point. To this subsetting point B, the maximum gain correction amount α stored in the assistant register circuit 7 is added. Straight lines are drawn from the points obtained by adding the maximum gain correction amount α to the subsetting point B, to the start point A (X1, Y1) and the end point C (X2, Y2) of the second folded interval, thus forming the second approximate linear γ characteristic ADC. Therefore, the second approximate linear γ characteristic ADC in the second folded interval is further divided into two intervals at the subsetting point B as a boundary.

In the sub-correction, fine adjustment can be performed by adding a sub-correction amount α', which is the difference in the γ direction between line segment ADC and line segment ABC, to the first nonlinearly-processed signal resulting from the process performed by the main circuit 3.

Figure 6B:
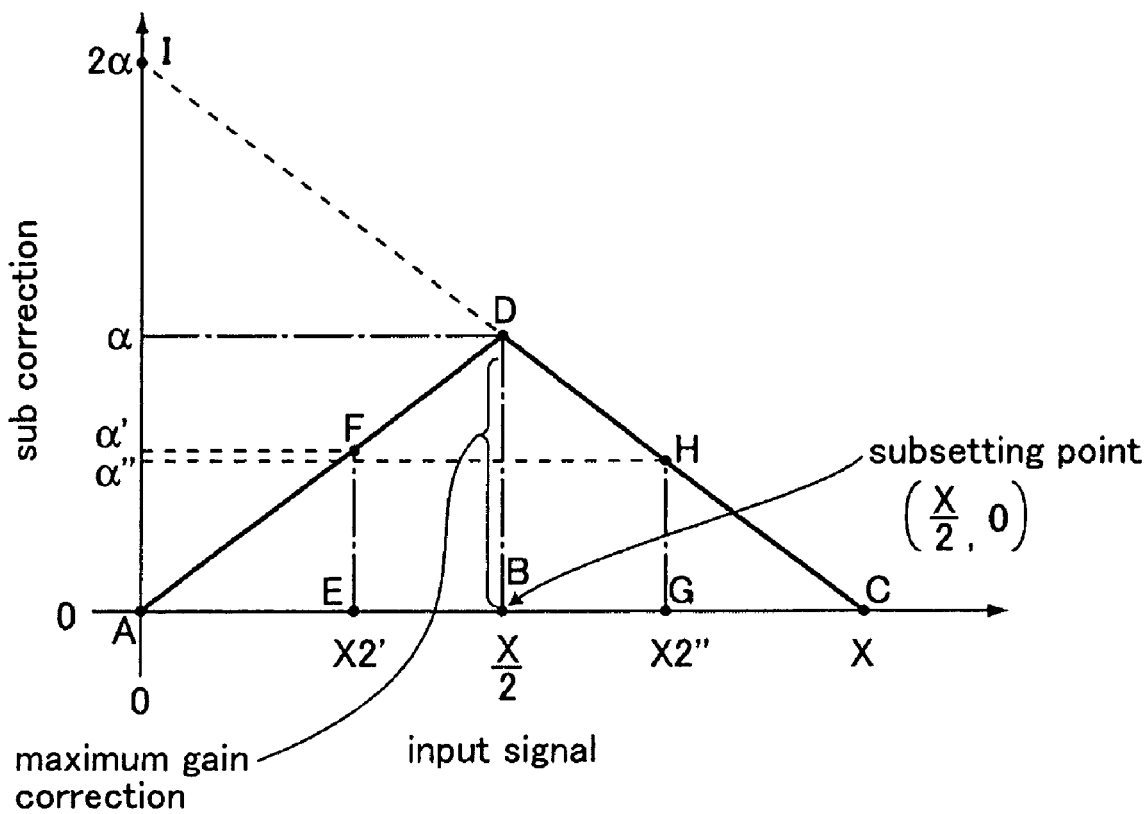

FIG. 6B shows a linear broken line segment ADC representing the sub-correction amount to be added to the first nonlinearly-processed signal in the second folded interval. The horizontal axis represents the input signal, and the vertical axis represents the sub-correction amount. Note that the start point A of the horizontal axis is set to 0, and the end point C thereof is set to X(=X2–X1).

The midpoint B (X/2, 0) of the horizontal axis is the subsetting point B shown in FIG. 6A. The sub-correction amount α is the maximum at the subsetting point B, and decreases toward the start point A and end point C of the interval. The maximum gain correction amount α to be added to the subsetting point B is the value read from the assistant register circuit 7. When this maximum gain correction amount is denoted by α, the gradient of line segment AD on the left half of the subsetting point B shown in FIG. 6B ($0 \leq x \leq X/2$) is $2\alpha/X$.

Accordingly, the sub-correction amount α' in the case where the nonlinear signal X2' is inputted, is $2\alpha/X \times X2'$. By adding this sub-correction amount α' to the first nonlinearly-processed signal E resulting from the process performed by the main circuit 3, a secondary nonlinearly-processed signal resulting from the fine adjustment performed by the assistant circuit 4 can be obtained. This secondary linearly-processed signal is outputted as the final nonlinearly-processed signal F of the nonlinear process circuit 1 from a signal output terminal 18.

Next, a method of calculating the sub-correction amount in the case where a nonlinear signal X2" as shown in FIG. 5 is inputted from the nonlinear circuit 2 into the nonlinear process circuit 1, i.e., the sub-correction amount is on the right half of the subsetting point B in FIG. 6B ($X/2 < x \leq X$), is described.

The gradient of line segment DC on the right half ($X/2 < x \leq X$) of the subsetting point B shown in FIG. 6B is $-2\alpha/X$. A point I, being a vertex of a dotted line obtained by extending the straight line DC on the right half shown in FIG. 6B to the left half and the vertical axis, is 2α. When sub-correction is y and input signal is x, the line DC is $y=(-2\alpha/X)*(x+2\alpha)$.

Accordingly, the subcorrection amount α" in the case where the nonlinear signal X2" is input, is $(-2\alpha/X)*(X2"+2\alpha)$. By adding this sub-correction amount α" to the first nonlinearly-processed signal G resulting from the process performed by the main circuit 3, a secondary nonlinearly-processed signal resulting from the fine adjustment performed by the assistant circuit 4 can be obtained. The secondary nonlinearly-processed signal H is outputted as the final nonlinearly-processed signal of the nonlinear process circuit 1 from a signal output terminal 18.

Recapitulating the first embodiment, with respect to the first embodiment, in a folded interval, an input signal x can fall within one of two intervals, i.e., the first half (1) of the folded interval or the second half (2) of the folded interval.

In the first half (1) of the folded interval:

$$0 \leq x \leq \frac{X}{2} \quad (1)$$

$$\text{on } AD: y_1 = \frac{Y+2\alpha}{X} \cdot x \quad \text{(Fig. 6A)}$$

$$\text{on } AB: y_2 = \frac{Y}{X} x$$

$$\text{on } AD: y_2 = \frac{Y}{X} x \quad \text{(Fig. 6B)}$$

$$\text{on } AD: y = y_1 - y_2 = \alpha' =$$

$$= \frac{2\alpha}{X} x$$

In the second half (2) of the folded interval:

$$\frac{x}{2} < x \leq X \quad (2)$$

$$\text{on } DC: y_3 = \frac{Y-2\alpha}{X} x + 2\alpha \quad \text{(Fig. 6A)}$$

$$\text{on } BC: y_4 = \frac{Y}{X} x$$

$$\text{on } DC: y = y_3 - y_4 = \alpha'' = \quad \text{(Fig. 6B)}$$

$$= -\frac{2\alpha}{X} x + 2\alpha$$

The main circuit 3 has used the relatively rough first approximate linear γ characteristic having four break point intervals as shown in FIG. 3. The assistant circuit 4 divides one break point interval into two intervals at the subsetting point of the break point interval as a boundary. Therefore, the nonlinear process circuit 1 finally performs a nonlinear process based on the approximate linear γ characteristic having eight break point intervals as shown in FIG. 4.

Thus, the number of main process circuits can be reduced to half of that in the prior art by dividing the nonlinear process circuit 1 into the main circuit 3 and the assistant circuit 4. Therefore, the circuit size of the nonlinear process circuit can be reduced. Moreover, since sub-correction can be performed by the assistant circuit, the correction precision of γ correction is not different from that in the prior art.

Figure 7:
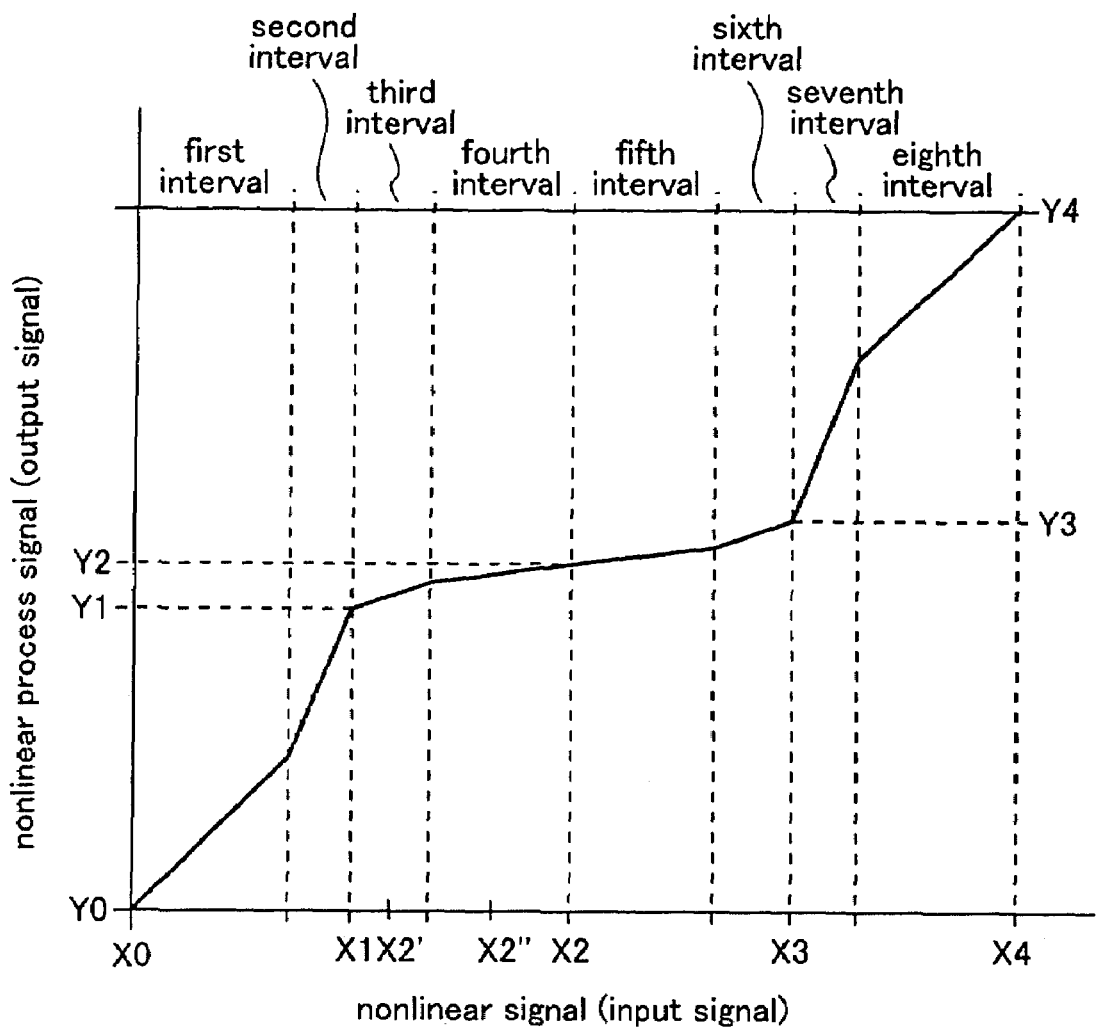
FIG. 7 shows an approximate linear γ function for a nonlinear process circuit according to a second embodiment.

A circuit diagram of a nonlinear process circuit according to a second embodiment of the present invention is the same as that of the nonlinear process circuit 1 according to the first embodiment shown in FIG. 3. Moreover, FIG. 7 shows an approximate linear γ characteristic of the second embodiment, which includes eight intervals, with a nonlinear signal (input signal) inputted into a signal input terminal 16 on the horizontal axis and a nonlinearly-processed signal (output signal) outputted from a signal output terminal 18 on the vertical axis.

Similar to the first embodiment, a nonlinear signal outputted from a nonlinear circuit 2 is nonlinearly processed in two steps using main circuit 3 and the assistant circuit 4. Set values of the main circuit 3 are stored in a main register circuit 6 within an approximate linear register circuit 5. Set values of the assistant circuit 4 are stored in a assistant register 7 within the assistant circuit 4. The main register 6 and the assistant register circuits 7 include storage circuits such as registers.

The main circuit 3 includes a signal analytic circuit 8 for analyzing an inputted nonlinear signal, four main process circuits 9 to 12 for performing multiplication on input signals in four divided folded intervals, and an output signal select circuit 13 for performing an addition process on signals processed by these main process circuits 9 to 12.

The assistant circuit 4 includes an assistant process circuit 14 for finely adjusting a signal processed by the main circuit 3, and the assistant register circuit 7 for storing a correction value in this assistant process circuit 14.

The approximate linear register circuit 5 includes the main register circuit 6 for setting the main circuit 3, and an assistant correction register circuit 15 for storing correction values for setting the assistant circuit 4.

A nonlinear signal outputted from the nonlinear circuit 2 is inputted into the nonlinear process circuit 1 through a signal input terminal 16.

The inputted nonlinear signal is inputted into the signal analytic circuit 8. The signal analytic circuit 8 determines which main process circuit out of the four main process circuits, i.e., the first to fourth main process circuits 9 to 12, processes the nonlinear signal. Moreover, from the nonlinear signal, the signal analytic circuit 8 forms to-be-processed signals to be outputted to the respective main process circuits 9 to 12.

A nonlinear process in the main circuit 3 is the same as that of the first embodiment. The main circuit 3 performs a nonlinear process based on the first approximate linear γ characteristic shown in FIG. 5, which includes first to fourth folded intervals.

Next, the assistant circuit 4 performs fine adjustment (sub-correction) on the nonlinearly-processed signal resulting from the nonlinear process (main correction) based on the rough first approximate linear γ characteristic in the main circuit 3.

The sub-correction is performed using the assistant circuit 4 including the assistant process circuit 14 and the assistant register circuit 7, and the assistant correction register circuit 15 within the approximate linear register circuit 5.

The assistant correction register circuit 15 stores respective maximum gain correction amounts and respective correction value addition directions for the folded intervals which the first approximate linear γ characteristic used in the main circuit 3 has.

The assistant register circuit 7 reads the maximum gain correction amount and correction value addition direction of one folded interval, which are stored in the assistant correction register circuit 15, and stores the maximum gain correction amount and the correction value addition direction. As described previously, the signal analytic circuit 8 can analyze the inputted nonlinear signal to determine the folded interval to which the nonlinear signal belongs. The assistant register circuit 7 can read only the corresponding maximum gain correction amount and correction value addition direction from the assistant correction register circuit 15.

The assistant process circuit 14 is a circuit for finely adjusting the first nonlinearly-processed signal resulting from the main correction performed by the main circuit 3.

An exemplary processing method of the sub-correction in the assistant circuit 4 is described. The description below takes the case where a nonlinear signal X2' in the second folded interval of the first approximate linear γ characteristic shown in FIG. 7 is inputted into the main circuit 3, as an example.

Figure 8A:
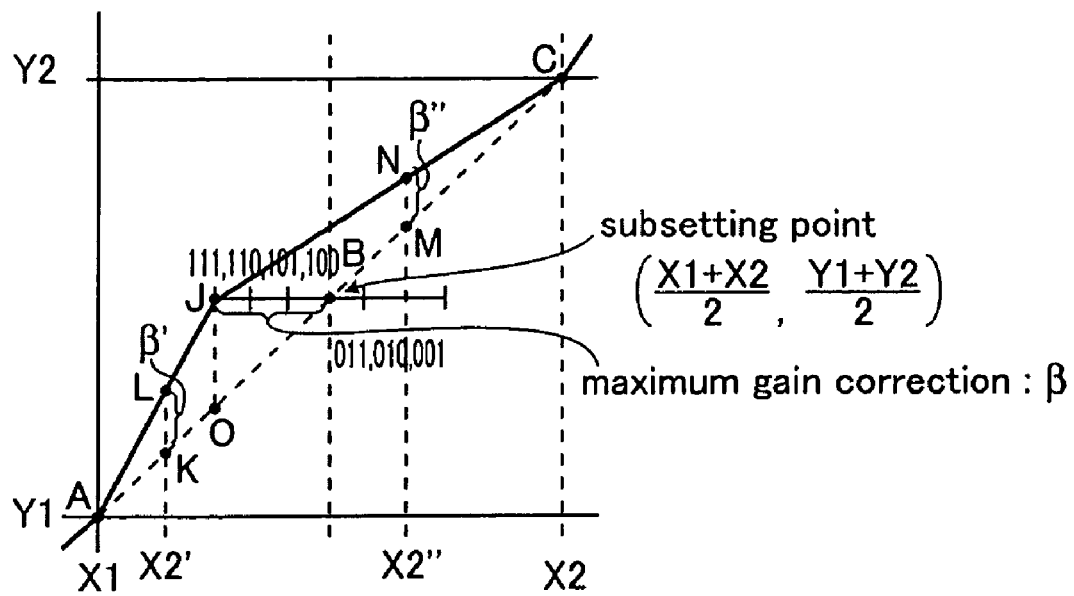
FIG. 8 shows part of an approximate linear γ function for the nonlinear process circuit in an assistant circuit.

FIG. 8A shows an approximate linear γ function obtained by enlarging the second folded interval of the first approximate linear γ characteristic shown in FIG. 5. The straight line ABC represented by a dotted line is the first approximate linear γ characteristic used in the aforementioned main circuit 3. The linear broken line segment AJC represented by a solid line is a second approximate linear γ characteristic resulting from the sub-correction performed by the assistant circuit 4.

An exemplary method of forming the second approximate linear γ characteristic is described. The midpoint B ((X1+X2)/2, (Y1+Y2)/2) of the first approximate linear γ characteristic in the second folded interval is set as a subsetting point. To this subsetting point B, the maximum gain correction amount β stored in the assistant register circuit 7 is added in the correction value addition direction stored therein. Straight lines are drawn from the maximum point J, obtained by adding the maximum gain correction amount to the subsetting point B, to the start point A (X1, Y1) and to the end point C (X2, Y2) of the second folded interval, thus forming the second approximate linear γ characteristic. Therefore, the second approximate linear γ characteristic is further divided into two intervals at the maximum point J at which a correction amount Yβ/X is added, as a boundary.

In the sub-correction, fine adjustment can be performed by adding a sub-correction amount β' to the first nonlinearly-processed signal K resulting from the process performed by the main circuit 3.

Figure 8B:
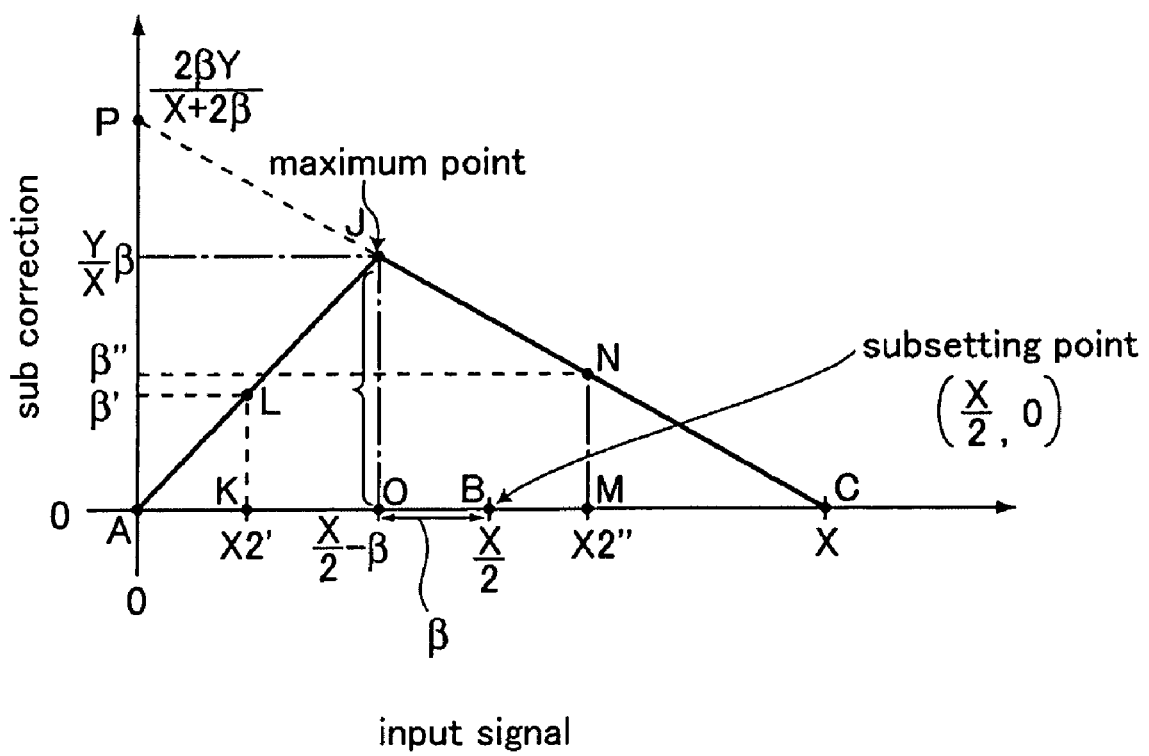

FIG. 8B shows a linear broken line segment AJC representing the sub-correction amount to be added to the first nonlinearly-processed signal in the second folded interval. The horizontal axis x represents the input signal, and the vertical axis y represents the sub-correction amount. Note that the start point A of the horizontal axis x is set to 0, and the end point C thereof is set to X(=X2−X1).

The midpoint B (X/2, 0) of the horizontal axis x is the subsetting point B shown in FIG. 8A. Here, a description is made assuming that the correction value addition direction read from the assistant register circuit 7 is the minus direction and that the maximum gain correction amount read therefrom is β. The sub-correction amount is the maximum at the point O placed β apart from the subsetting point B in the minus direction, and decreases toward the start point A or end point C of the interval.

When the maximum gain correction amount at the point O which is placed β apart from this subsetting point B is denoted by Yβ/X, the gradient of the sub-correction amount on the left side AJ of the point O shown in FIG. 8B is 2βY/(X−2β).

Accordingly, the sub-correction amount β' in the case where the nonlinear signal X2' is inputted, is 2βY/(X−2β)*X2'. By adding this sub-correction amount β' to the first nonlinearly-processed signal K (Y2'−Y0) resulting from the process performed by the main circuit 3, a secondary nonlinearly-processed signal L resulting from the fine adjustment performed by the assistant circuit 4 can be obtained. This secondary linearly-processed signal L is outputted as the final nonlinearly-processed signal of the nonlinear process circuit 1 from a signal output terminal 18.

Next, a method of calculating a sub-correction amount in the case where a nonlinear signal X2″ as shown in FIG. 7 is inputted from the nonlinear circuit 2 into the nonlinear process circuit 1 is described.

The gradient JC of the correction amount on the right side of the point O shown in FIG. 8B (X/2−β<x<X) is −2βY/{X(X+2β)}. A point P, being a vertex of a dotted line obtained by extending the straight line JC on right side shown in FIG. 8B to the left side and vertical axis, is 2βY/(X+2β). When sub-correction is y and input signal is x, the line JC is y=−2βY/{X(X+2β)}x+2βY/(X+2β).

Accordingly, the subcorrection amount β″ in the case where the nonlinear signal X2″ is input 2βY/{X(X+2β)}*X2″+2βY/(X+2β). By adding this sub-correction amount β″ to the first nonlinearly-processed signal M(Y″−Y0) resulting from the process performed by the main circuit 3, a secondary nonlinearly-processed signal resulting from the fine adjustment performed by the assistant circuit 4 can be obtained. The secondary nonlinearly-processed signal N is outputted as the final nonlinearly-processed signal of the nonlinear process circuit 1 from a signal output terminal 18.

Recapitulating the second embodiment, in a folded interval, an input signal x can fall within one of two intervals, i.e., the first half (1) of the folded interval or the second half (2) of the folded interval.

In the first half (1) of the folded interval:

$$0 \leq x \leq \frac{x}{2} - \beta \quad (1)$$

$$\text{on } AJ: y_1 = \frac{Y}{X - 2\beta} x \qquad \text{Fig. 8A}$$

$$\text{on } AB: y_2 = \frac{Y}{X} x$$

$$\text{on } AJ: y = y_1 - y_2 = \beta' = \qquad \text{Fig. 8B}$$

$$= \frac{2\beta Y}{X - 2\beta} \cdot x$$

In the second half (2) of the folded interval:

$$\frac{x}{2} - \beta < x \leq X \quad (2)$$

$$\text{on } JD: y_3 = \frac{Y}{X + 2\beta} x + \frac{2\beta Y}{X + 2\beta} \qquad \text{Fig. 8A}$$

$$\text{on } BC: y_4 = \frac{Y}{X} x$$

$$\text{on } JD: y = y_3 - y_4 = \beta'' = \qquad \text{Fig. 8B}$$

$$= -\frac{2\beta Y}{X(X + 2\beta)} x + \frac{2\beta Y}{X + 2\beta}$$

Similar to the first embodiment, in the second embodiment the main circuit 3 has used the relatively rough first approximate linear γ characteristic having four folded intervals. The assistant circuit 4 divides one folded interval into two intervals at the maximum point of the interval as a boundary. Therefore, the nonlinear process circuit 1 finally performs a nonlinear process based on the approximate linear γ characteristic having eight intervals as shown in FIG. 7.

The point at which the assistant circuit 4 divides one folded interval is not the midpoint B of the folded interval for the main circuit 3 but the point shifted from the subsetting point B by an amount corresponding to the maximum gain correction value. Thus, in the approximate linear γ characteristic for the nonlinear process circuit according to the second embodiment, the maximum point J at which the division is performed can be arbitrarily set. Therefore, since the approximate linear γ characteristic can be formed more smoothly, a nonlinear process which is more approximate to the γ characteristic can be performed.

Incidentally, an approximate linear γ characteristic having eight intervals has been used in the above embodiments. However, the effect of the present invention can be obtained not only in the above case but also in the case where the number of intervals is less than or greater than eight.

As the number of intervals of the approximate linear γ characteristic is increased, the circuit size can be reduced effectively because the number of required main process circuits is increased.

In addition, the present invention includes a method by which the non-linear conversion is implemented, as above described. According to this aspect of the present invention, there is provided a method for performing a nonlinear transformation of a nonlinear input signal, comprising (a) forming the nonlinear input signal into a first nonlinearly-processed signal using a first function which has an approximate linear characteristic divided into a plurality of intervals; and (b) converting the first nonlinearly-processed signal into a second nonlinearly-processed signal using a second function wherein plural of the intervals have an approximate linear characteristic divided into two interconnected line segments.

In the present method, step (a) preferably includes determining a particular interval in which the nonlinear input signal falls; forming the nonlinear input signal into a plurality of first processed signals for respective of the intervals; multiplying the first processed signals by predetermined coefficients to form second processed signals; and adding the second processed signals to form the first nonlinearly-processed signal.

In the present method, step (b) preferably includes adding a correction value derived using the second function to the first nonlinearly-processed signal.

In the present method, according to one embodiment step (b) preferably includes reading from a memory, which stores gain correction amounts for respective of the approximate linear characteristic of the plurality of intervals of the first function, a stored gain correction amount corresponding to the approximate linear characteristic of said particular interval; and forming the second function by adding to a midpoint of said particular interval the read gain correction amount to set a point at which the second function in the particular interval has a maximum gain over the first function in the particular interval.

In the present method, according to another embodiment step (b) preferably includes reading from a memory, which stores gain correction amounts and respective correction directions for respective of the approximate linear characteristic of the plurality of intervals of the first function, a stored gain correction amount and correction direction corresponding to the approximate linear characteristic of said particular interval; and forming the second function by adding to a midpoint of said particular interval the read gain correction amount in the read correction direction to set a point at which the second function in the particular interval has a maximum gain over the first function in the particular interval. According to the present invention, the method uses first second functions which define a γ characteristic for processing a nonlinear image signal.

This invention conveniently may be implemented using a conventional general purpose computer or micro processor programmed according to the teachings of the present invention, as will be apparent to those skilled in the computer art. Appropriate software can readily be prepared by programmers of ordinary skill based on the teachings of the present disclosure, as will be apparent to those skilled in the software art. Specifically, all of the equations may be implemented by suitably selected computer hardware and software.

As disclosed in U.S. Pat. No. 6,546,067 which is incorporated by reference herein, a computer may implement the method of the present invention, wherein the computer houses a motherboard which contains a CPU, memory (e.g., DRAM, ROM, EPROM, EEPROM, SRAM, SDRAM, and Flash RAM), and other optical special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

As stated above, the system includes at least one computer readable medium. Examples of computer readable media are compact discs, hard disks, floppy disks, tape, magneto optical disks, PROMS (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Computer program products of the present invention include any computer programmed to perform the method of the invention as well as any computer readable medium which stores computer instructions (e.g., computer code devices) which when executed b a computer cause the computer to perform the method of the present invention. The computer code devices of the present invention can be any interpreted or executable code mechanism, including but not limited to, scripts, interpreters, dynamic link libraries, Java classes, and complete executable programs. Moreover, parts of the processing of the present invention may be distributed for better performance, reliability, and/or cost. For example, processing in regard to the first function may be performed on a first computer and processing in regard to the second function may be performed on a second computer and the results combined.

The invention may also be implemented by the preparation of application specific integrated circuits (ASICs) or by interconnecting an appropriate network of conventional component circuits, as will be readily apparent to those skilled in the art.

The computer program product of the present invention stores instructions which when executed by a computer causes the computer to implement a method for performing a nonlinear transformation of a nonlinear input signal, the method including (a) forming the nonlinear input signal into a first nonlinearly-processed signal using a first function which has an approximate linear characteristic divided into a plurality of intervals; and b) converting the first nonlinearly-processed signal into a second nonlinearly-processed signal using a second function wherein plural of the intervals have an approximate linear characteristic divided into two interconnected line segments.

In the computer program product of the present invention, in a preferred embodiment step (a) includes determining a particular interval in which the nonlinear input signal falls; forming the nonlinear input signal into a plurality of first processed signals for respective of the intervals; multiplying the first processed signals by predetermined coefficients to form second processed signals; and adding the second processed signals to form the first nonlinearly-processed signal.

In the computer program product of the present invention, in a preferred embodiment step (b) includes adding a correction value derived using the second function to the first nonlinearly-processed signal.

In the computer program product of the present invention, in a preferred embodiment step (b) includes reading from a memory, which stores gain correction amounts for respective of the approximate linear characteristic of the plurality of intervals of the first function, a stored gain correction amount corresponding to the approximate linear characteristic of said particular interval; and forming the second function by adding to a midpoint of said particular interval the read gain correction amount to set a point at which the second function in the particular interval has a maximum gain over the first function in the particular interval.

In the computer program product of the present invention, in a preferred embodiment step (b) includes reading from a memory, which stores gain correction amounts and respective correction directions for respective of the approximate linear characteristic of the plurality of intervals of the first function, a stored gain correction amount and correction direction corresponding to the approximate linear characteristic of said particular interval; and forming the second function by adding to a midpoint of said particular interval the read gain correction amount in the read correction direction to set a point at which the second function in the particular interval has a maximum gain over the first function in the particular interval.

In the computer program product of the present invention, in a preferred embodiment the method includes using first and second functions which define a γ characteristic for processing a nonlinear image signal.

Furthermore, although first and embodiments are separately described, the present invention includes implementations where the two embodiments are combined, for example, where the correction in one folded interval is implemented according to the first embodiment, and a correction in a different folded interval is implemented in a second folded interval. Furthermore, according to the present invention, both positive and negative gain correction amounts and directions may be stored, read and utilized in the formation of the second correction function.

Numerous modifications and variations of the present invention are possible in light of the above teachings. It is therefore to be understood that, within the scope of the appended claims, the present invention can be practiced in a manner other than as specifically described herein.

What is claimed is:

1. A nonlinear process circuit configured to perform a nonlinear transformation of a nonlinear input signal, comprising:
   a main circuit configured to form the nonlinear input signal into a first nonlinearly-processed signal using a first function which has an approximate linear characteristic divided into a plurality of intervals; and
   an assistant circuit configured to form the first nonlinearly-processed signal into a second nonlinearly-processed signal using a second function which has an approximate linear characteristic in which each of the intervals is divided into two connected line segments,
   wherein the main circuit includes
      a decision circuit configured to determine a particular interval out of the intervals in which the nonlinear input signal falls;
      a signal-generation circuit configured to form the nonlinear input signal into a plurality of first processed signals for each of the intervals;
      a plurality of main processing circuits corresponding to respective intervals, each of the main processing circuits configured to multiply the first processed signals inputted into the respective intervals by predetermined coefficients to form second processed signals; and
      a first addition circuit configured to add the second processed signals resulting from multiplication processes in the respective intervals, the first addition circuit forming the first nonlinearly-processed signal, and
   the assistant circuit includes
      an assistant storage circuit configured to store a correction amount to be added to the first function, and the assistant circuit is configured to read the correction amount of a selected interval from the assistant storage circuit, and to form the second function having characteristics in which the correction amount is added to at a midpoint of the selected interval of the first function such that a point at which the correction amount has been added is set as a maximum gain and the correction amount decreases toward start and end points of the selected interval.

2. The nonlinear process circuit according to claim 1, further comprising:
   a storage circuit configured to store correction amounts for the respective intervals, wherein the assistant storage circuit is configured to read the correction amount of the selected interval from the storage circuit.

3. A nonlinear process circuit configured to perform a nonlinear transformation of a nonlinear input signal, comprising:
   a main circuit configured to form the nonlinear input signal into a first nonlinearly-processed signal using a first function which has an approximate linear characteristic divided into a plurality of intervals;
   a storage circuit configured to store predetermined coefficients; and
   an assistant circuit configured to form the first nonlinearly-processed signal into a second nonlinearly-processed signal using a second function which has an approximate linear characteristic in which each of the intervals is divided into two connected line segments,
   wherein the main circuit includes
      a decision circuit configured to determine a particular interval out of the intervals in which the nonlinear input signal falls;
      a signal-generation circuit configured to form the nonlinear input signal into a plurality of first processed signals for each of the intervals;
      a plurality of main processing circuits corresponding to respective intervals, each of the main processing circuits configured to multiply the first processed signals inputted into the respective intervals by predetermined coefficients to form second processed signals; and
      a first addition circuit configured to add the second processed signals resulting from multiplication processes in the respective intervals, the first addition circuit forming the first nonlinearly-processed signal, and the assistant circuit includes
an assistant storage circuit configured to store a correction amount to be added to the first function and a direction value indicating a direction in which the correction amount is to be added, and the assistant circuit is configured to read the correction amount for the selected interval from the assistant storage circuit, and to add the correction amount to a midpoint of the selected interval of the first function in a direction of the direction value read from the assistant storage circuit to form the second function having characteristics in which a point at which the correction amount has been added is set as a maximum gain and in which the correction amount decreases toward start and end points of the selected interval.

4. The nonlinear process circuit according to claim 3, further comprising:
a storage circuit storing correction amounts and direction values for the respective intervals, wherein the assistant storage circuit is configured to read the correction amount and the direction value of the selected interval from the storage circuit.

5. A method for performing a nonlinear transformation of a nonlinear input signal, comprising:
forming the nonlinear input signal into a first nonlinearly-processed signal using a first function which has an approximate linear characteristic divided into a plurality of intervals;
converting the first nonlinearly-processed signal into a second nonlinearly-processed signal using a second function wherein the plurality of intervals have an approximate linear characteristic divided into two connected line segments, by
reading from a memory, which stores gain correction amounts for the respective approximate linear characteristic of the plurality of intervals of the first function, a stored gain correction amount corresponding to the approximate linear characteristic of a particular interval, and
adding a correction value derived using the second function to the first nonlinearly-processed signal, by adding to a midpoint of said particular interval the read gain correction amount to set a point at which the second function in the particular interval has a maximum gain over the first function in the particular interval.

6. A method for performing a nonlinear transformation of a nonlinear input signal, comprising:
forming the nonlinear input signal into a first nonlinearly-processed signal using a first function which has an approximate linear characteristic divided into a plurality of intervals;
converting the first nonlinearly-processed signal into a second nonlinearly-processed signal using a second function wherein the plurality of intervals have an approximate linear characteristic divided into two connected line segments, by
reading from a memory, which stores gain correction amounts and respective correction directions for the respective approximate linear characteristic of the plurality of intervals of the first function, a stored gain correction amount and correction direction corresponding to the approximate linear characteristic of a particular interval, and
adding a correction value derived using the second function to the first nonlinearly-processed signal, by adding to a midpoint of said particular interval the read gain correction amount in the read correction direction to set a point at which the second function in the particular interval has a maximum gain over the first function in the particular interval.

7. A method for performing a nonlinear transformation of a nonlinear input signal, comprising:
forming the nonlinear input signal into a first nonlinearly-processed signal using a first function which has an approximate linear characteristic divided into a plurality of intervals, by
determining a particular interval in which the nonlinear input signal falls,
forming the nonlinear input signal into a plurality of first processed signals for respective intervals,
multiplying the first processed signals by predetermined coefficients to form second processed signals, and
adding the second processed signals to form the first nonlinearly-processed signal; and
converting the first nonlinearly-processed signal into a second nonlinearly-processed signal using a second function wherein a plurality of the intervals have an approximate linear characteristic divided into two connected line segments, by
reading from a memory, which stores gain correction amounts for the respective approximate linear characteristic of the plurality of intervals of the first function, a stored gain correction amount corresponding to the approximate linear characteristic of a particular interval, and
adding a correction value derived using the second function to the first nonlinearly-processed signal, by adding to a midpoint of said particular interval the read gain correction amount to set a point at which the second function in the particular interval has a maximum gain over the first function in the particular interval.

8. A method for performing a nonlinear transformation of a nonlinear input signal, comprising:
forming the nonlinear input signal into a first nonlinearly-processed signal using a first function which has an approximate linear characteristic divided into a plurality of intervals, by
determining a particular interval in which the nonlinear input signal falls,
forming the nonlinear input signal into a plurality of first processed signals for respective intervals,
multiplying the first processed signals by predetermined coefficients to form second processed signals, and
adding the second processed signals to form the first nonlinearly-processed signal; and
converting the first nonlinearly-processed signal into a second nonlinearly-processed signal using a second function wherein a plurality of the intervals have an approximate linear characteristic divided into two connected line segments, by
reading from a memory, which stores gain correction amounts and respective correction directions for the respective approximate linear characteristic of the plurality of intervals of the first function, a stored gain correction amount and correction direction corresponding to the approximate linear characteristic of a particular interval, and
adding a correction value derived using the second function to the first nonlinearly-processed signal, by adding to a midpoint of said particular interval the read gain correction amount in the read correction direction to set a point at which the second function in the particular interval has a maximum gain over the first function in the particular interval.

* * * * *